Oct. 8, 1940.  L. J. FAULDER  2,217,045
METHOD OF DRESSING OR REDRESSING FILES
Filed Oct. 22, 1938
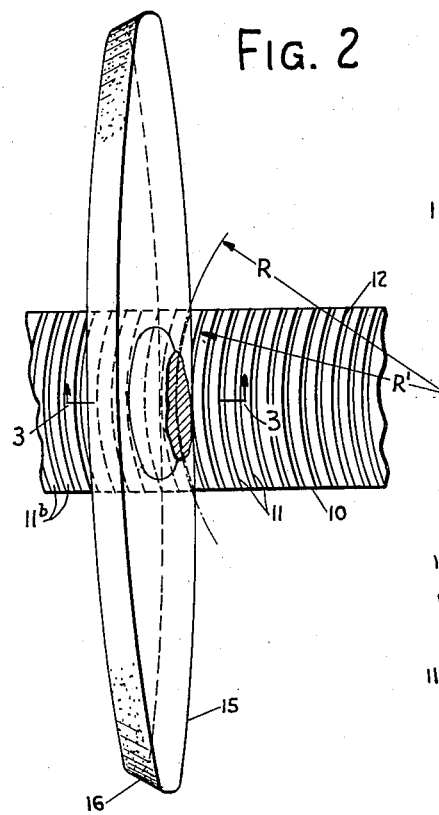
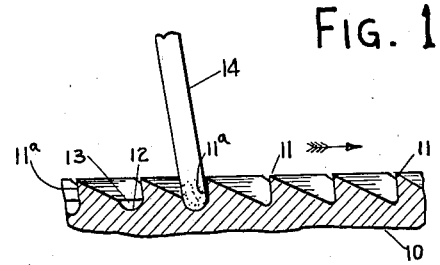
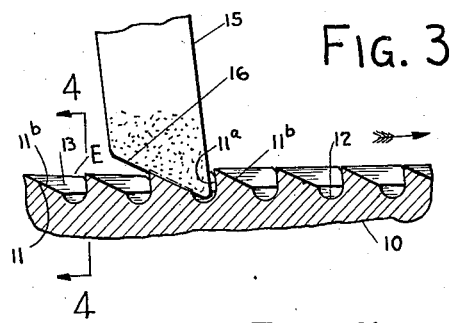
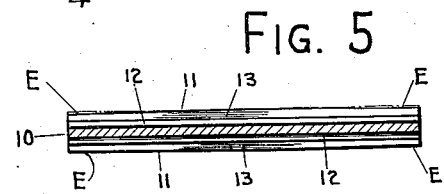
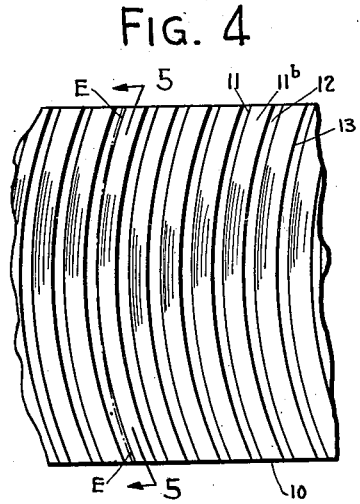
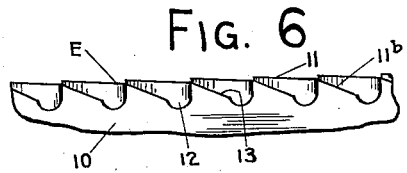
INVENTOR
LEANDER J. FAULDER
BY
ATTORNEY Patented Oct. 8, 1940

2,217,045

UNITED STATES PATENT OFFICE 2,217,045

METHOD OF DRESSING OR REDRESSING FILES

Leander J. Faulder, Akron, Ohio

Application October 22, 1938, Serial No. 236,539

3 Claims. (Cl. 51—281)

This invention relates to methods of dressing or redressing files.

The general object of the invention is to provide a simple and efficient method of dressing or forming the teeth on curved tooth files of hardened metal or redressing the cutting teeth of use files.

Another object of the invention is to provide an improved method of dressing or redressing teeth on curved tooth files so that the cutting edges thereof are laterally cambered to the proper degree for use in filing metal and other surfaces.

These and other objects of the invention will be manifest from the following brief description and the accompanying drawing.

Of the accompanying drawing:

Figure 1 is a fragmentary cross-section through the longitudinal center of a file, illustrating the manner of forming a throat or grooved portion at the bottom of each tooth recess.

Figure 2 is a fragmentary plan view of a curved tooth file with a grinding wheel set in an initial grinding position thereon to form the teeth in accordance with the method embodying the invention.

Figure 3 is an enlarged fragmentary cross-section on line 3—3 of Figure 2, illustrating the relative cutting position of the grinding wheel at the center of the file.

Figure 4 is an enlarged fragmentary plan view of the file formed or reconditioned in accordance with the invention.

Figure 5 is a cross-section on line 5—5 of Figure 4 showing the cambered cutting edges produced by the improved method.

Figure 6 is a further enlarged, fragmentary edge view of the finished file shown in Figures 4 and 5.

Referring to Figure 1 of the drawing, 10 may be either a new file having preformed curved teeth 11, 11 to be finished or dressed in accordance with the invention, or it may be a used file to be sharpened or redressed. A groove 12 may be provided at the bottom of each tooth recess 13 for automatically emptying the recess of filings when the file is in use. Groove 12 is particularly desirable on reconditioned files because each successive sharpening operation tends to shorten the depth of recess 13, so that without the grooves filings may accumulate in the recess to a certain extent and possibly scratch a surface being filed while the file is in use. Grooves 12 may be formed by setting a suitably shaped rotatable grinding wheel 14 at the bottom of recess 13 and relatively moving either wheel 14 or file 10 about a fixed point. The arc of swing of the moving element in the latter case preferably is such that groove 12 will be substantially parallel with the front face 11ª of the adjacent tooth 11. File 10 may be progressively moved in the direction of the arrow the distance equal to the tooth pitch as the wheel and file become disengaged at the end of each groove cutting operation. Wheel 14 also may be utilized to finish the front faces 11ª of teeth 11, particularly when the teeth are being formed on rough blanks for new files.

As best shown in Figures 2 and 3, the top or rear faces 11ᵇ may be finished by first setting a rotatable grinding wheel 15, suitably beveled at 16, at the center of the file 10 with the rear face of wheel 15 closely adjacent the front face 11ª of the next tooth, and then relatively moving either file 10, or wheel 15, as the case may be, about a fixed point C. In this manner a line contact is made between grinding wheel 15 and face 11ᵇ. The radius of swing R along the top edge of the tooth, and obviously the arc of the dressing or redressing cut, is greater than the original radius R¹ of the top edge of the tooth, consequently increasingly more material is dressed or redressed from the tooth toward margins E of the file than at the center thereof. The result is that a curved tooth file having sharp, uniformly cambered, cutting edges is provided. As wheel 15 and file 10 become disengaged at the end of each tooth finishing cycle, the file may be progressively moved in the direction of the arrow (Figure 3), a distance equal to the pitch of the teeth, to grind the next succeeding tooth. The results obtained by finishing or reconditioning files in the manner described are best illustrated in Figures 4, 5, and 6. The camber of the filing edges has been slightly exaggerated in the drawing to more clearly bring out the results obtained by the method described. For ordinary purposes the difference between the depth of the tooth at the center of the file and at the marginal edges thereof is usually only a few thousandths of an inch.

It will be understood that sometimes the arc of the tooth is not centered between the side edges of the file to be dressed or redressed but the tool must be set for a dressing or redressing operation so that the arc of the tooth and the arc of the dressing or redressing cut are substantially coincident or tangent to each other at the point where the radius of the arc is parallel to the sides of the files whether or not such point is in the center of the file between the side edges. It is this point which in the appended claims is referred to as the center of the arc of the tooth which as will be understood is not necessarily the center of the file.

Modifications of the invention may be resorted to without departing from the spirit thereof or the scope of the appended claims.

What is claimed is:

1. That method of dressing or redressing curved tooth files which comprises relatively moving a file and a cutting tool so that said cutting tool engages the file along an arc substantially parallel to the arc of a tooth to provide a groove at the bottom of the tooth recess, and relatively moving said file and a dressing or redressing tool so that said last named tool engages a tooth along an arc the radius of which is greater than the radius of the tooth.

2. That method of dressing or redressing curved tooth files which comprises relatively moving a file and a cutting tool so that said cutting tool engages the file along an arc substantially parallel to the arc of a tooth to provide a groove at the bottom of the tooth recess, and relatively moving said file and a dressing or redressing tool so that said last named tool engages a tooth along an arc the radius of which is greater than the radius of the tooth, said file and tool being initially set so that the arc of dressing or redressing movement is substantially tangent to the arc of the tooth at the center thereof.

3. That method of dressing or redressing curved tooth files which comprises so relatively moving a file and a dressing or redressing tool that the tool engages the top face of a tooth as the relative movement is carried out along an arc the radius of which is greater than the radius of curvature of the tooth, said file and tool being initially set so that the arc of the relative dressing or redressing movement is substantially tangent to the arc of the tooth in the central portion of the file between the sides thereof.

LEANDER J. FAULDER.